United States Patent
Badenoch et al.

(10) Patent No.: US 6,181,997 B1
(45) Date of Patent: Jan. 30, 2001

(54) VEHICLE SUSPENSION CONTROL WITH COMPENSATION FOR YAW CORRECTING ACTIVE BRAKE CONTROL

(75) Inventors: Scott Wilson Badenoch, Bloomfield Hills, MI (US); David Andrew Shal, Bellbrook, OH (US); Albert Victor Fratini; Karen Marie Connair, both of Kettering, OH (US); Harold David Hamilton, Cincinnati, OH (US)

(73) Assignee: Delphi Technologies, Inc., Troy, MI (US)

( * ) Notice: Under 35 U.S.C. 154(b), the term of this patent shall be extended for 0 days.

(21) Appl. No.: 09/283,055

(22) Filed: Apr. 1, 1999

(51) Int. Cl.$^7$ .............................. G06F 17/00; G06F 7/00; G06F 19/00
(52) U.S. Cl. .......................... 701/37; 701/72; 280/5.512; 280/5.515
(58) Field of Search .................................. 701/1, 37, 38, 701/72, 83; 280/5.512, 5.513, 5.515

(56) References Cited

U.S. PATENT DOCUMENTS

| | | | |
|---|---|---|---|
| 4,616,846 | * 10/1986 | Furuya et al. | 280/5.516 |
| 5,024,460 | * 6/1991 | Hanson et al. | 280/5.519 |
| 5,062,657 | * 11/1991 | Majeed | 280/5.503 |
| 5,071,157 | * 12/1991 | Majeed | 280/5.515 |
| 5,255,191 | * 10/1993 | Fulks | 701/37 |
| 5,475,593 | * 12/1995 | Townend | 701/38 |
| 5,517,414 | 5/1996 | Hrovat . | |
| 5,584,498 | * 12/1996 | Danek | 280/5.503 |
| 5,606,503 | * 2/1997 | Shal et al. | 701/1 |
| 5,720,533 | * 2/1998 | Pastor et al. | 303/147 |
| 5,746,486 | * 5/1998 | Paul et al. | 303/146 |
| 6,032,770 | * 3/2000 | Alcone et al. | 188/378 |

FOREIGN PATENT DOCUMENTS

| | | |
|---|---|---|
| 0417792 | 3/1991 | (EP) . |
| 0607516 | 7/1994 | (EP) . |
| 0734890 | 2/1996 | (EP) . |
| 5-169957 | 9/1993 | (JP) . |
| 05309063 | 4/1994 | (JP) . |
| 11-020444 | 1/1999 | (JP) . |

* cited by examiner

Primary Examiner—William A. Cuchlinski, Jr.
Assistant Examiner—Gertrude Arthur
(74) Attorney, Agent, or Firm—Robert M. Sigler

(57) ABSTRACT

A vehicle suspension system is responsive to an active brake signal from a brake system indicating the application of a greater braking force to one front corner brake than to the other front corner brake to affect vehicle yaw rate. The vehicle suspension system determines the relative velocities of the front corner suspension adjacent the front corner brake receiving the greater braking force and the diagonally opposed rear corner suspension and further determines a compression damping command for the front corner suspension and a rebound damping command for the rear corner suspension. While the active brake signal is present, the suspension control applies the compression damping command for the front corner suspension when its relative velocity indicates that it is in compression. While the active brake signal is present, the suspension control also applies the rebound damping command for the rear corner suspension when its relative indicates that it is in rebound.

4 Claims, 6 Drawing Sheets

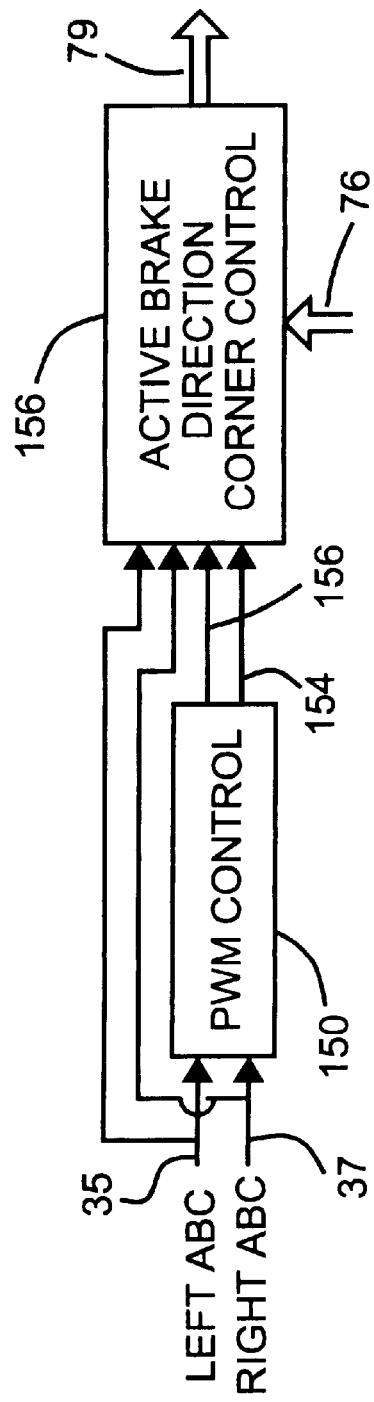
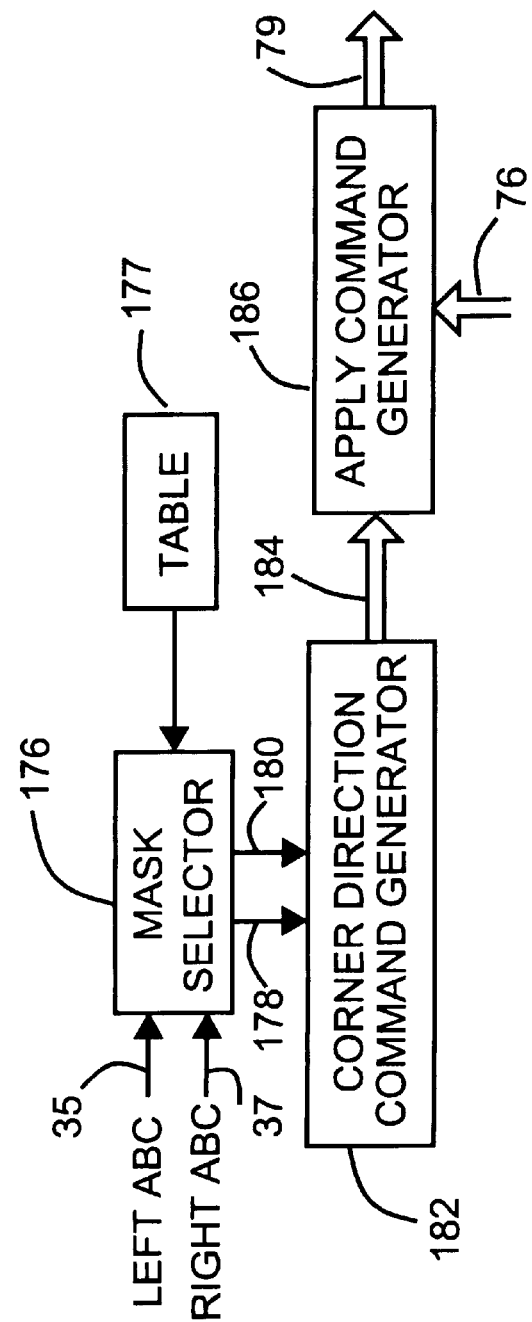

VEHICLE SUSPENSION CONTROL WITH COMPENSATION FOR YAW CORRECTING ACTIVE BRAKE CONTROL

TECHNICAL FIELD OF THE INVENTION

This invention relates to a vehicle suspension control system and method.

BACKGROUND OF THE INVENTION

Some automotive vehicles are equipped with vehicle dynamic stability controls that apply braking force at specific corners of the vehicle to initiate changes in vehicle yaw rate. But the application of a braking force at a specific corner also creates a body pitch motion at that corner that can cause a tilting motion of the vehicle body around a diagonal axis. For example, in order to reverse an excessive yaw rate to the right, the stability control may apply a braking force at the left front corner of the vehicle, or a greater braking force at the left front corner than at the right front corner. But this also produces a downward pitch of the left front corner of the vehicle and a reacting upward pitch of the right rear corner of the vehicle that essentially create a tilting motion of the body about a diagonal axis with the left front corner of the vehicle dipping and the right rear of the vehicle rising. A similar movement, with the right front corner dipping and the left rear corner rising, tends to result from application of a greater braking force to the vehicle brake at the front right corner to initiate a vehicle yaw rate change in the opposite direction. Such body movement may be undesirable to occupants of the vehicle.

Many automotive vehicles have suspensions that vary damping force in response to control commands determined by a computer controller, in order to improve overall vehicle ride comfort and handling. Such systems are generally responsive to vehicle body motions to reduce the diagonal body tilting motion described above, but such general response requires the undesirable body motion to occur and be sensed before the system can react to it. In addition, since the cause of the undesirable body motion is not known by such a system, the response must be general in nature and may not be optimal for the specific dynamic situation.

It is also known in the art to provide a signal indicating activation of a vehicle brake pedal or braking system generally to provide immediate stiffening of both front suspension dampers so as to minimize brake induced vehicle pitch (dive). But such systems do not optimally control a pitch on only one side, with a resulting tilting of the vehicle body around a diagonal axis.

SUMMARY OF THE INVENTION

This invention adapts a variable damping suspension to be responsive to a specific active brake signal from a vehicle braking control that is applying a greater braking force to one front corner than the other to affect vehicle yaw rate so as to optimally control pitch at the one front corner and the diagonally opposed rear corner and thus the resulting tilting motion of the vehicle body about a diagonal axis.

More specifically, a vehicle suspension system is responsive to an active brake signal from a brake system indicating the application of a greater braking force to one front corner brake than to the other front corner brake to affect vehicle yaw rate. The vehicle suspension system determines the relative velocities of the front corner suspension adjacent the front corner brake receiving the greater braking force and the diagonally opposed rear corner suspension and further determines a compression damping command for the front corner suspension and a rebound damping command for the rear corner suspension. While the active brake signal is present, the suspension control applies the compression damping command for the front corner suspension when its relative velocity indicates that it is in compression and applies the rebound damping command for the rear corner suspension when its relative indicates that it is in rebound.

In a preferred embodiment, the control also derives demand force commands for dampers at each corner of the vehicle from relative velocity signals at the corners of the vehicle and applies the demand force command to each damper only when a comparison of the direction of the demand force command for a damper with the sensed relative velocity of the damper indicates that a force corresponding to the demand force command can be effectively exerted by the damper. But the compression and rebound damping commands are applied to the appropriate dampers according to the direction of relative velocity only, without regard to the direction of the demand force command for the corner.

BRIEF DESCRIPTION OF THE DRAWINGS

The present invention will now be described by way of example with reference to the following figures, in which:

FIG. 3 illustrates a brake responsive body control for use in the suspension controller of FIG. 2.

FIG. 4 illustrates an active brake direction corner control for use in the brake responsive body control of FIG. 3.

DETAILED DESCRIPTION OF THE INVENTION

Figure 1:
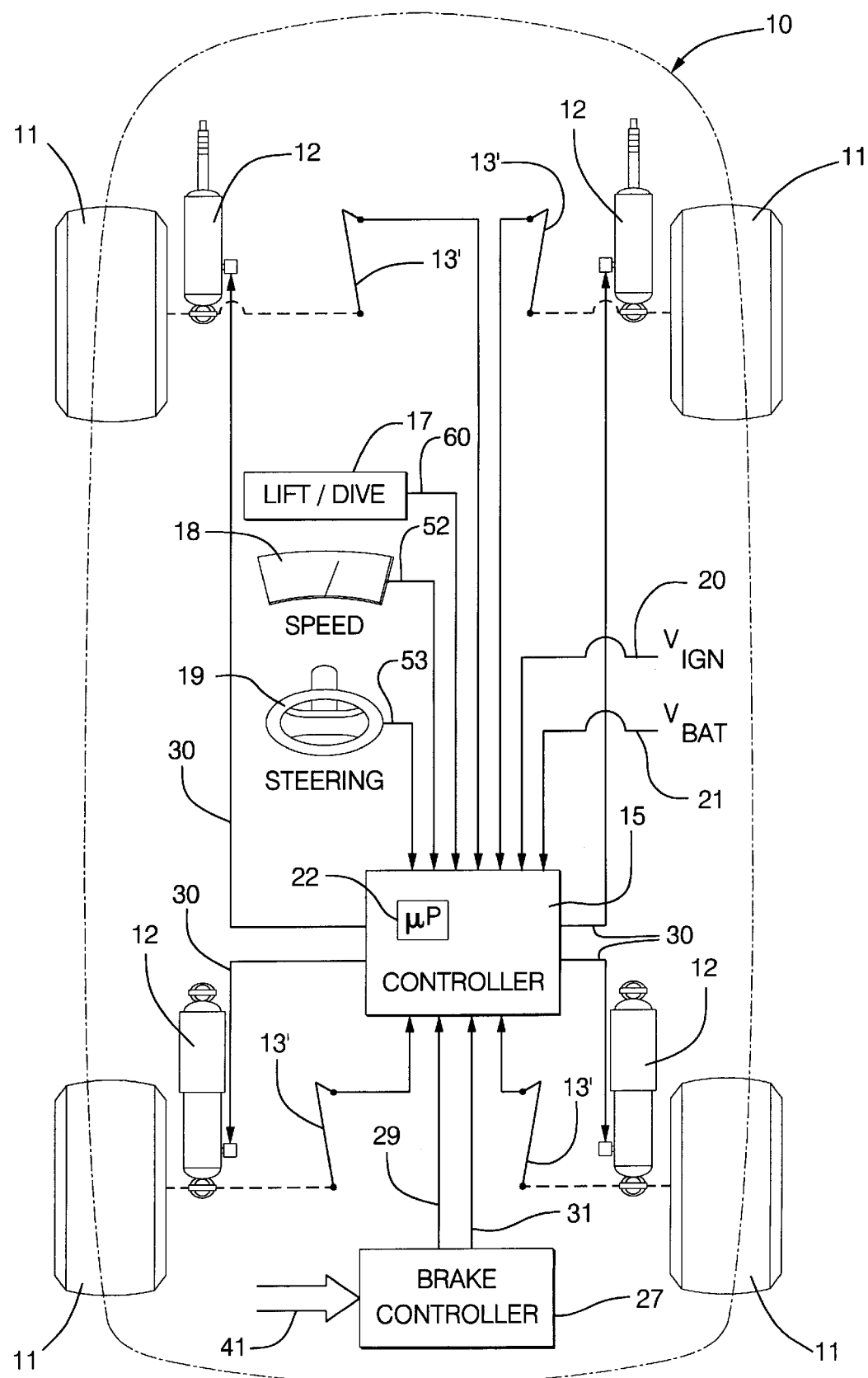
FIG. 1 illustrates a vehicle with a braking system and a suspension system according to this invention.

Referring to FIG. 1, an example apparatus implementing this invention comprises a vehicle body 10 supported on four wheels 11 by four suspensions including springs of a known type (not shown). Each suspension includes a variable-force, real time, controllable damper 12 connected to exert a vertical force between wheel 11 and body 10 at that suspension point. Although many such suspension arrangements are known and appropriate to this invention, actuator 12 of the preferred embodiment comprises an electrically controllable, variable force damper in parallel with a weight bearing coil spring in a parallel spring/shock absorber or McPherson strut arrangement. A description of a variable force damper suitable for use as actuator 12 is the continuously variable damper described in U.S. Pat. No. 5,282,645.

Each corner of the vehicle includes a position sensor 13 that provides an output signal indicative of the relative vertical distance between the vehicle wheel and the suspended vehicle body at that corner of the vehicle. The outputs of position sensors 13 may be differentiated to produce relative body-wheel vertical velocity signals for each corner of the vehicle and may be used, for example, as described in U.S. Pat. No. 5,606,503, to determine the body modal velocities of body heave velocity, body roll velocity and body pitch velocity. The relative body-wheel vertical velocity signals are an example of what is referred to herein as a set of parameters indicative of motion of a body of the vehicle and of motion of wheels of the vehicle.

An example position sensor 13 includes a resistive device mounted to the vehicle body and a link pivotally coupled between the vehicle wheel and a pivot arm on the resistive device such that the resistive device provides an impedance output that varies with the relative vertical position between wheel 11 and the corner of body 10. Each position sensor 13 may further include an internal circuit board with a buffer circuit for buffering the output signal of the resistive device and providing the buffered signal to a suspension controller 15. Suitable position sensors 13 of this are known to, or can be constructed by, those skilled in the art. Any alternative type of position sensor, including transformer type sensors, may be used as position sensors 13.

The outputs of relative position sensors 13 are provided to suspension controller 15 which processes the signals, for example as described in U.S. Pat. No. 5,606,503, to determine the states of vehicle body 10 and wheels 11 and generates an output actuator control signal for each variable actuator 12. Suspension controller 15 sends these signals through suitable output apparatus to control actuators 12 in real time. Other signals that suspension controller 15 may use include a lift/dive signal from a sensor 17, a vehicle speed signal from a sensor 18 and a steering wheel angular position from a sensor 19. Obtaining such signals may be achieved through the use of known types of sensors or vehicle control signals available to those skilled in the art.

Vehicle 10 also includes a brake controller 27 that electronically controls the frictional braking force of vehicle wheel brakes 39 through use of actuators of a known type (not shown) to provide various wheel braking functions. These controls may include anti-lock brake control for preventing incipient wheel lock up during vehicle braking (deceleration) maneuvers, and/or traction control for preventing wheel slip during forward vehicle acceleration; and they specifically include an active brake control for controlling vehicle yaw rate or, if desired, slip angle. Controller 27 responds to many of the various sensors shown in the figure along with various additional sensors (not shown) whose signals are represented by bus 41. Example additional sensors might include vehicle wheel speed sensors, a vehicle yaw rate sensor and/or a vehicle lateral acceleration sensor. Implementation of these additional sensors, along with example anti-lock brake controls, traction controls and active brake controls are known to those skilled in the art. The brake controller 27 provides left and right active brake control (ABC) signals to suspension controller 15, to be described in detail below, during active brake control operation. Representative examples of brake controller 27 are shown and described in U.S. Pat. No. 5,720,533 to Pastor et al, issued Feb. 24, 1998 and U.S. Pat. No. 5,746,486 to Paul et al, issued May 5, 1998.

Figure 2:
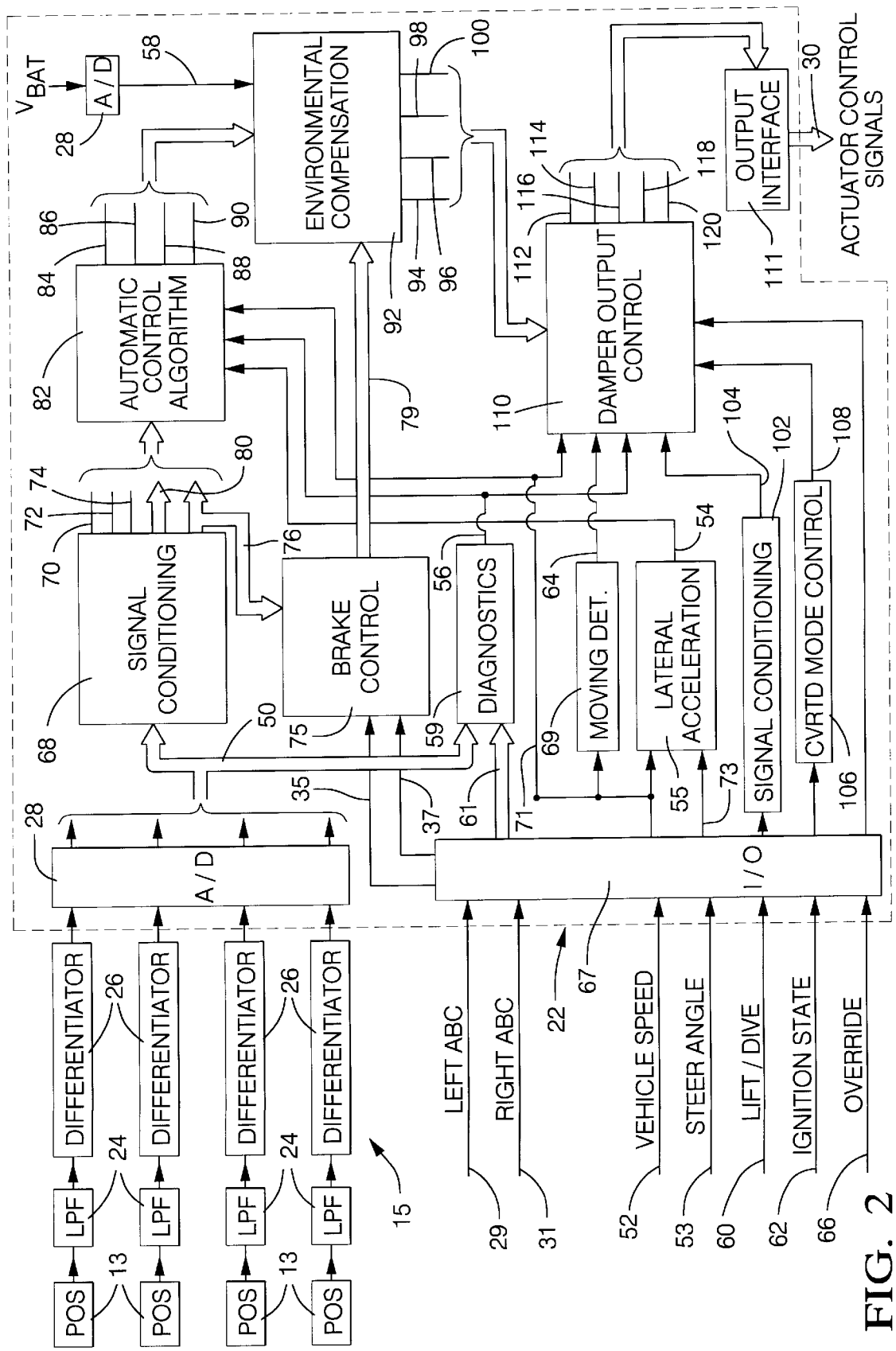
FIG. 2 illustrates a suspension controller for use in the vehicle of FIG. 1.

Suspension controller 15, shown in more detail in FIG. 2, may be a digital microcomputer 22 programmed to process a plurality of input signals in a stored algorithm and generate output control signals for actuators 12. Analog signal processing is provided for some of the input signals. For example, signals from relative position sensors 13 are low-pass filtered through four analog low-pass filters 24 and differentiated through four analog differentiators 26 to provide four relative velocity signals. An exemplary combination of such a low pass filter and differentiator is shown in U.S. Pat. No. 5,255,191, issued Oct. 19, 1993. The resulting relative velocity signals represent the relative vertical velocities between each of wheels 11 and the corresponding corner of the body. Each of these relative velocity signals is input to microcomputer 22, which includes an input A/D converter 28 with multiplexed inputs. Reference 50 represents the four corner suspension relative vertical velocities input into the microprocessor 22 through A/D converter 28. In an alternative example implementation, relative position sensors 13 are replaced with relative velocity sensors of a type known to those killed in the art capable of outputting signals indicative of the relative velocity between each wheel and corner of the vehicle body. In this alternative, there is no need for the differentiators 26.

Various digital/discrete signals are provided to microcomputer 22 through I/O apparatus 67. Lines 29 and 31 carry the left and right front active brake control signals, which are provided as left and right ABC flags on lines 35 and 37 within microcomputer 22. Line 52 provides a vehicle speed signal from sensor 18, which signal is preferably buffered in a known manner in block 67 to remove unwanted noise; and the buffered signal is output on line 71. This signal, which may be the same as that used for the vehicle speedometer and/or other vehicle systems, may comprise a pulse train having pulse timing varying with vehicle speed. The decoding of this signal is well known in the art. Line 53 provides a steering angle signal to I/O apparatus 67 from sensor 19 and is output on line 73. This signal may be obtained from a rotational sensor in the steering gear, with a number of sensors and designs known in the art. Line 60 provides a signal that indicates when the vehicle is in a dive (front end dip) or lift (front end rise) tendency situation such as occurs during hard braking or hard acceleration of the vehicle. Lift/dive sensor 17 may be part of a powertrain controller that determines a vehicle dive tending situation if a decrease in vehicle speed over a predetermined time period is greater than a predetermined limit and determines a lift tending situation if an increase in throttle angle over a predetermined time period is greater than a predetermined threshold. The signal from lift/dive sensor 17 is generally a discrete, binary signal that has a first value when there is either a detected lift or dive, and is otherwise inactive. Line 62 provides an discrete, binary ignition state signal indicative of vehicle operation; and line 66 provides a discrete override signal useful for in-plant testing or service of the system.

A lateral acceleration calculator 55 is effective to derive a vehicle lateral acceleration signal in a known manner from the vehicle speed signal on line 71 and the vehicle steering angle signal on line 73 and output the derived vehicle lateral acceleration signal on line 54. A diagnostic routine is responsive to various signals in I/O apparatus 67 to perform known functions such as checking for open circuits and short circuits from any of the sensors, input lines or actuators or any of the other lines (represented in general as bus 61) and is capable of generating a system failure command on an output line 56.

The digital outputs of A/D converter 28 are provided to signal conditioning block 68, in which each is digitally high-pass filtered to remove any DC offset introduced by the digitization of A/D converter 28. Block 68 derives from these filtered signals a set of relative velocity signals for the four corners on bus 76, a set of estimated average wheel velocity signals for the four wheels on bus 80 and a set of body modal (heave, pitch and roll) velocity signals on lines 70, 72 and 74, respectively for use in automatic control algorithm 82, to derive actuator control signals representing the demand force commands for each of actuators 12 and outputs these commands on lines 84, 86, 88 and 90. The demand force commands generated by automatic control algorithm 82 are preferably PWM duty cycle commands. However, actuators of another type not based on PWM control can be substituted as an alternative; and it will be recognized that variable force controls other than those with PWM control are equivalents to the PWM control example set forth herein.

The PWM duty cycle commands from automatic control algorithm 82 on lines 84, 86, 88 and 90 are provided to environmental compensation block 92. A set of four active brake PWM duty cycle commands derived in accordance with this invention for the same wheels in a brake responsive body control 75 is also provided to environmental compensation block 92 on a bus 79. Environmental compensation block 92 derives a combined PWM duty cycle command for each wheel from the PWM duty cycle command from automatic control algorithm 82 and the active brake PWM duty cycle command from control 75 corresponding to the same wheel. Alternatively, the combination may be performed within automatic control algorithm 82 after the PWM duty cycle commands determined thereby are ready for the combination. Preferably, the method of combination is to select the larger of the PWM duty cycle command from automatic control algorithm 82 and the active brake PWM duty cycle command from control 75 for the same wheel. Brake responsive body control 75 will be described in detail below.

Environmental compensation block 92 then scales the four combined PWM duty cycle commands based on a scaling factor derived from the vehicle battery voltage $V_{BAT}$, which is input to microcomputer 22 through an A/D converter 28. The scaled combined PWM duty cycle commands for the four wheels are then output on lines 94, 96, 98 and 100.

Damper output control 110 receives the scaled combined PWM duty cycle commands and determines when to output these signals on output lines 112, 114, 116, 118 and 120 and when to override these signals for some specific purpose. For example, damper output control 110 may be responsive to a diagnostic failure command from diagnostic block 59 to output predetermined "failure mode" PWM duty cycle commands: for example, a default PWM command that is scaled simply in response to vehicle speed. Control 110 may be responsive to the override signal from line 66 to actuate all dampers in a predetermined manner for in-plant or service testing. Control 110 may be responsive to the lift/dive signal, debounced in signal conditioning block 102, to set minimum values for the PWM duty cycle commands, as described in greater detail in the aforementioned U.S. Pat. No. 5,606,503. Control 110 is responsive to an enable signal on line 108 from a mode control apparatus 106 to enable the output of commands from block 10. The enable signal is generated by mode control apparatus 106 in response to an active ignition state signal on line 62. Without an enable signal on line 108, any commands determined will not be output on lines 112, 114, 116, 118 and 120 and the controller is allowed to enter a standard "sleep" state of the type used in automotive controllers when the vehicle ignition is off. An enable signal on line 108 does not force any output command levels, but simply enables output of the commands from block 110.

The resultant control outputs from block 110 are provided to an output interface 111 on lines 112, 114, 116 and 118 and comprise the duty cycle commands for the four actuators 12 in the suspension system. The damper low side control command is provided on line 120. The duty cycle commands on lines 112, 114, 116 and 118 are converted in a known manner to pulse width modulated signals having the duty cycles commanded by the signals on lines 112, 114, 116 and 118. Output interface 111 includes a PWM control comprising standard signal processing and power electronic circuitry, possibly including another microcomputer, such as a Motorola™ 68HC11 KA4, which is adapted for providing PWM output control commands. The interface between the microcomputer controller and the variable force dampers may include standard power electronic switches and protective circuitry as required for controlling current in a valve activating solenoid coil such as is shown in U.S. Pat. No. 5,282,645, issued Feb. 1, 1994. The valve responds to a pulse width modulated signal and provides a continuously variable range of decrease in flow restriction of a bypass passage to the reservoir of the damper between maximum restricted flow when the valve is closed in response to a 0% duty cycle command and a minimum restricted flow when the valve is open and responsive to 100% duty cycle command, or vice versa. Those skilled in the art will understand that any suitable microprocessor-based controller capable of providing the appropriate actuator command and performing the required control routine can be used in place of the example set forth herein and are equivalents thereof.

As previously stated, active brake PWM duty cycle commands are derived by active brake body control block 75 in response to the left and right active brake control (ABC) signals generated by brake controller 27 and provided from I/O apparatus on lines 35 and 37, respectively. For example, when brake controller 27 activates the left front wheel brake with a greater braking force than the right front brake to bring the vehicle yaw rate and/or slip angle into conformity with a desired yaw rate and/or slip angle, the braking causes a downward pitching motion of body 10 at its left front corner. Since the right front brake is not simultaneously actuated, or is actuated with a lesser braking force, the motion is actually a combination of pitch and roll producing a tilting motion of the body about a diagonal axis generally extending between the right front and left rear corners. Although automatic control algorithm 82 will respond to both the pitch and the roll, the initiation of the motion by brake controller 27 provides the opportunity to provide a faster response more optimally directed at the precise input from the braking system. Block 75 anticipates this type of body motion and generates suspension commands on bus 79 to minimize it. These commands on bus 79 are active brake PWM duty cycle commands determining minimum duty cycles for each damper based on the active brake control signals and the compression or rebound state of the damper.

To use knowledge of the activity of brake system 27, it is necessary to provide a signal of that activity to suspension controller 15; and this is done via the left and right active brake control (ABC) signals. The brake control is not normally and continuously engaged in yaw or slip angle control; rather, such control is only a temporary response to a sensed dynamic condition of the vehicle. Thus, this part of the brake control is normally inactive, for the purposes of this invention, even when applying braking, as long as such braking is applied essentially equally to both front wheels. Any dive resulting from such activity (or lift resulting from hard acceleration) is taken care of by the dive/lift portion of the system, which applies correction on both sides equally. Anti-lock or traction control brake modulation also does not require the correction of this invention, since such modulation does not produce significant body modal motion. The "active" signal is generated only when the brake system is actively braking for yaw or slip angle control by directing that more front braking force be applied to one side of the vehicle than to the other side. Thus, the left front ABC signal (usually in the form of a binary flag) is set in its active state only when more braking force is being directed to the left front wheel than to the right front wheel and is otherwise reset to its inactive state; and the right front ABC signal is set in its active state only when more braking force is being directed to the right front wheel than to the left front wheel and is otherwise reset to its inactive state. Stated differently, whenever braking system 27 is actively overriding normal braking to correct the directional steering response of the vehicle, either the left front ABC signal or the right front ABC signal, but not both, will be set active, depending on which side of the vehicle is being slowed down with respect to the other. Generally, such flags will exist in a brake system capable of such operation; if they do not, they can easily be created with a few simple additions to the control program. The states of these two flags are provided to an output port of brake control 27 and communicated as the left and right ABC signals on lines 29 and 31.

Figure 5:
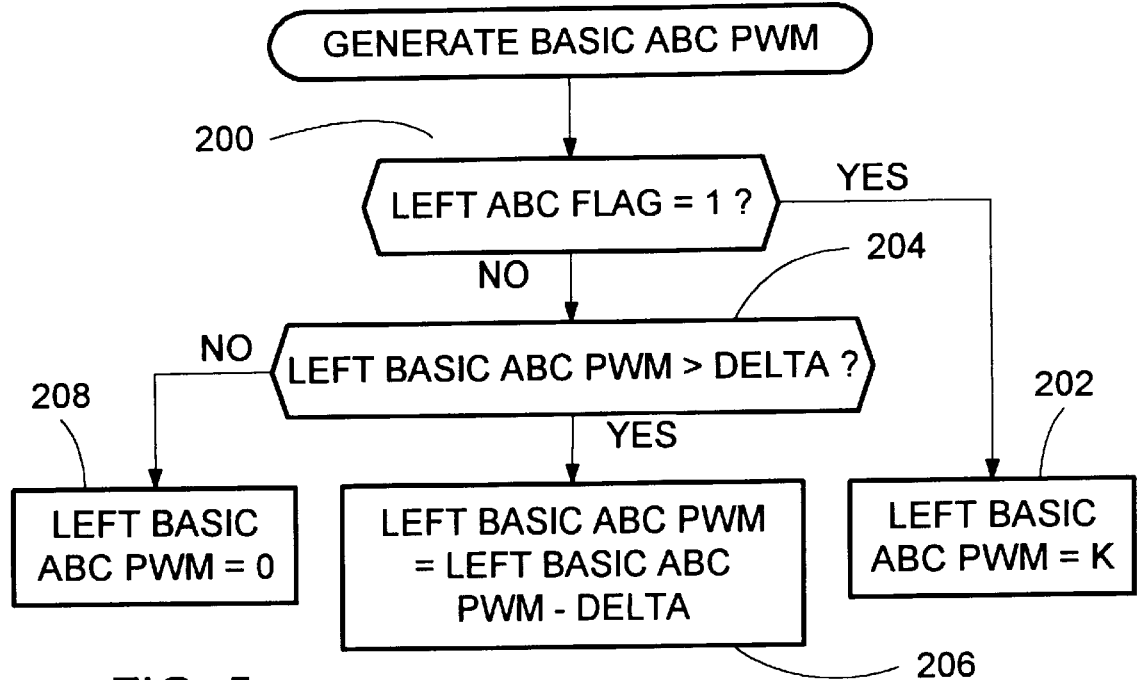
FIGS. 5–9 are flow charts illustrating the operation of selected portions of the brake responsive body control of FIG. 3.

Referring now to FIG. 3, a general block diagram of body control block 75 is shown. The left and right ABC flags on lines 35 and 37 are provided to the PWM control block 150, which generates two commands in response to the signals on lines 35 and 37. If the left ABC flag indicates that the left front active brake control flag is set, then block 150 outputs a LEFT BASIC ABC PWM command on line 152 set to a predetermined level programmed in controller memory. If the left front active brake control flag resets, then block 150 reduces the command on line 152 at a predetermined rate (by a predetermined amount each cycle) until it reaches zero. If the right front active brake control flag is set then block 150 outputs a RIGHT BASIC ABC PWM command on line 154 set to a predetermined level programmed in controller memory. If the right front active brake control flag resets, then block 150 reduces the command on line 154 at a predetermined rate until it reaches zero. An example flow chart of this function is shown in FIG. 5 for the LEFT BASIC ABC PWM. The subroutine GENERATE BASIC ABC PWM begins by determining at 200 whether the left ABC flag is equal to 1 (that is, active). If so, the LEFT BASIC ABC PWM is set equal to a predetermined value K at 202. If not, the subroutine determines at 204 if the value of LEFT BASIC ABC PWM is greater than a predetermined decrement value DELTA. If it is greater, then a new, decremented value of LEFT BASIC ABC PWM is derived at 206 by subtracting DELTA from the old value. But if it is not greater, the new value of LEFT BASIC ABC PWM is set equal to zero at 208. A similar flow process may be used for the RIGHT BASIC ABC PWM.

Block 156, the active brake direction corner control, receives the LEFT and RIGHT BASIC ABC PWM signals on lines 152 and 154, along with the left and right ABC flags on lines 35 and 37 and the filtered corner relative velocity signals on bus 76. Block 156 determines which corners (e.g., front left, front right, rear left and rear right) will receive corner ABC PWM commands, based on the flags on lines 35 and 37 and whether the each corner is in compression or rebound. Block 156 provides the resultant corner ABC PWM commands on bus 79. Block 156 is described in more detail below with reference to FIG. 4.

Referring now to FIG. 4, active brake direction corner control block 156 includes a mask selector block 176. Mask selector block 176 receives the left and right ABC flags on lines 35 and 37 and selects two of the four data masks stored in a table 177 for use in a corner direction command generator block 182. Each data mask is coded to define a unique relationship to the four corner suspensions for both compression and rebound modes, and the data masks are chosen on the basis of whether each of the received left and right ABC flags is active (ACT) or inactive (HOLD). The active (ACT) data masks are used to reduce the diagonal body tilting motion at the initiation of the active brake operation, and the inactive (HOLD) data masks are used to prevent an opposite, "rebound" body tilting effect at the end of the active brake operation while phasing out the ABC PWM value. An example table stored in block 177 is as follows:

|  | COMPRESSION | | | | REBOUND | | | |
|---|---|---|---|---|---|---|---|---|
|  | LF (bit 7) | RF (bit 6) | LR (bit 5) | RR (bit 4) | LF (bit 3) | RF (bit 2) | LR (bit 1) | RR (bit 0) |
| L ACT MASK | 1 | 0 | 0 | 0 | 0 | 0 | 0 | 1 |
| L HOLD MASK | 1 | 0 | 0 | 1 | 1 | 0 | 0 | 1 |
| R ACT MASK | 0 | 1 | 0 | 0 | 0 | 0 | 1 | 0 |
| R HOLD MASK | 0 | 1 | 1 | 0 | 0 | 1 | 1 | 0 |

Figure 6:
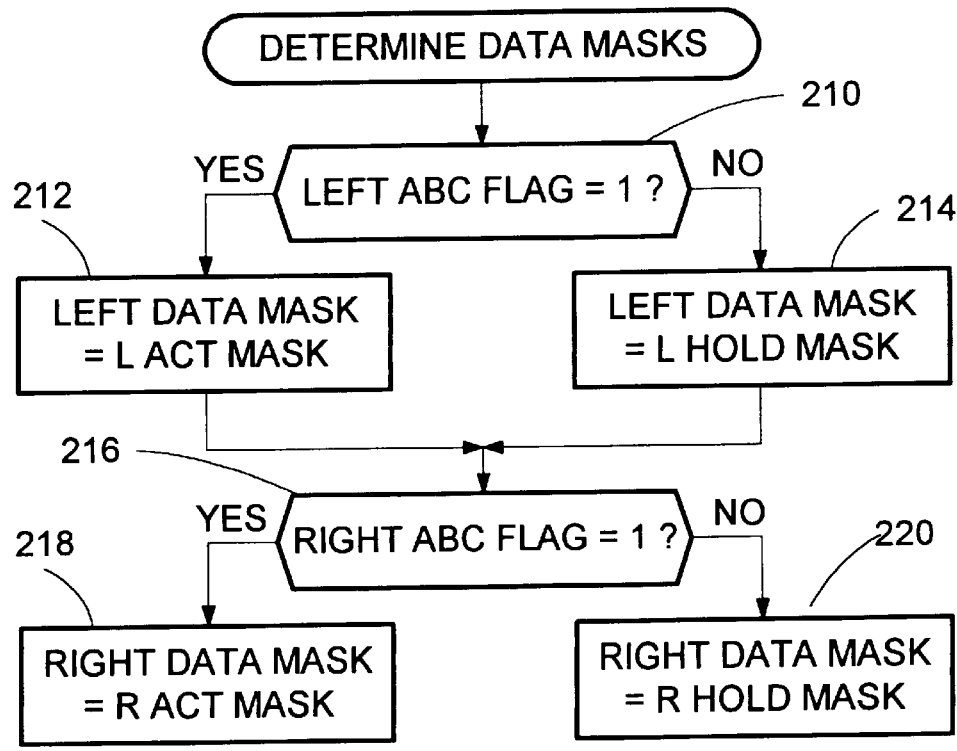

The function of mask selector 176 is described with reference to the flow chart of FIG. 6. Subroutine DETERMINE DATA MASKS first determines at 210 if the left ABC flag on line 35 is set to 1 (active). If so, the L ACT MASK is selected at 212 for line 178. But if the left ABC flag on line 35 is set to 0 (inactive), then the L HOLD MASK is selected at 214 for line 178. Similarly, the subroutine determines at 216 if the right ABC flag on line 37 is set to 1 (active). If so, the R ACT MASK is selected at 218 for line 180. But if the right ABC flag on line 37 is set to 0 (inactive), then the R HOLD MASK is selected at 220 as the right mask for line 180.

The left and right masks on lines 178 and 180 are provided along with the signals on lines 152 and 154 to corner direction command generator block 182, which determines and outputs corner PWM values for each of the four corners of the vehicle body in compression and rebound modes on bus 184. Essentially, corner direction command generator block 182 determines, as directed by the chosen masks from block 176, which corner(s) will receive which of the BASIC ABC PWM commands generated in block 150 in compression, in rebound or both. More particularly, block 182 (1) determines eight TEMPL PWM commands based on the selected left mask and eight TEMPR PWM commands based on the selected right mask, and (2) determines for each corner the larger of the TEMPL PWM and TEMPR PWM to be output as the CORNER PWM command for that corner.

Figure 7:
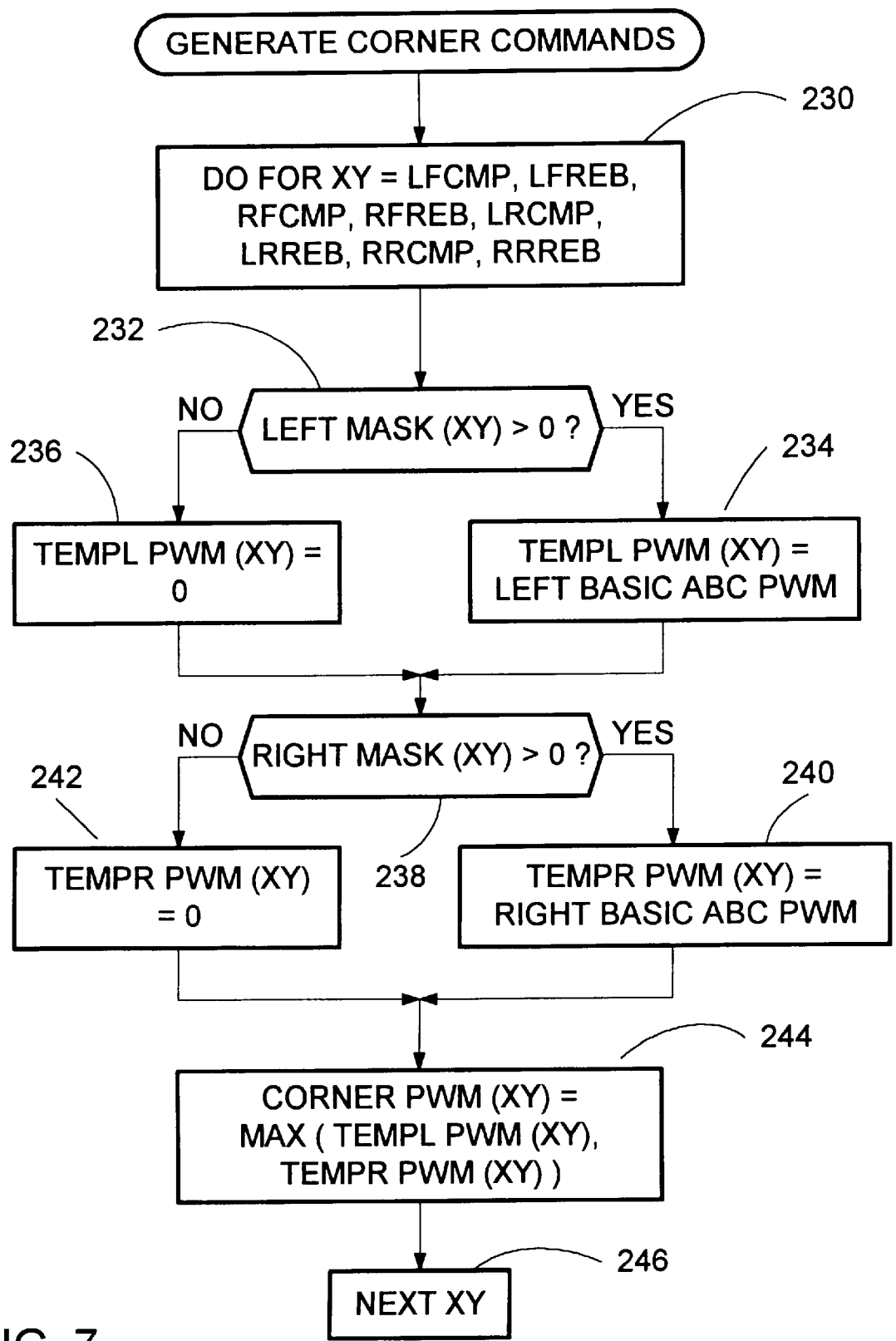

The operation of corner direction command generator 182 is described utilizing the flow chart of FIG. 7. This flow chart describes a repetitive loop that is run eight times. At 230, the parameters of the loop are declared: DO for each value of bit XY of the stated mask, where the values of X indicate the four corners (LF, RF, LR, RR) and the values of Y indicate the compression/rebound state (CMP, REB), resulting in eight possible combinations. The loop begins by determining at 232 if the appropriate bit of the selected left mask (L ACT MASK or L HOLD MASK) is equal to 1. If so, it sets the corresponding value of TEMPL PWM (XY) to the received value of LEFT BASIC ABC PWM at 234; if not, it sets the corresponding value of TEMPL PWM (XY) to zero at 236. The loop then performs a similar function for corresponding bit of the selected right mask. The loop determines at 238 if the appropriate bit of the selected right mask (R ACT MASK or R HOLD MASK) is equal to 1. If so, it sets the corresponding value of TEMPR PWM (XY) to the received value of RIGHT BASIC ABC PWM at 240; if not, it sets the corresponding value of TEMPR PWM (XY) to zero at 242. Thus, a value of TEMPL PWM (XY) and a value of TEMPR PWM (XY) are derived in each loop before the maximum of the two values is selected at 244 as CORNER PWM (XY) and the loop is repeated for the next value of XY determined at 246. When the loop has completed its eight cycles, the result is an array of eight values of CORNER PWM (XY), one for each corner of the vehicle in each of the compression and rebound modes.

Figure 8:
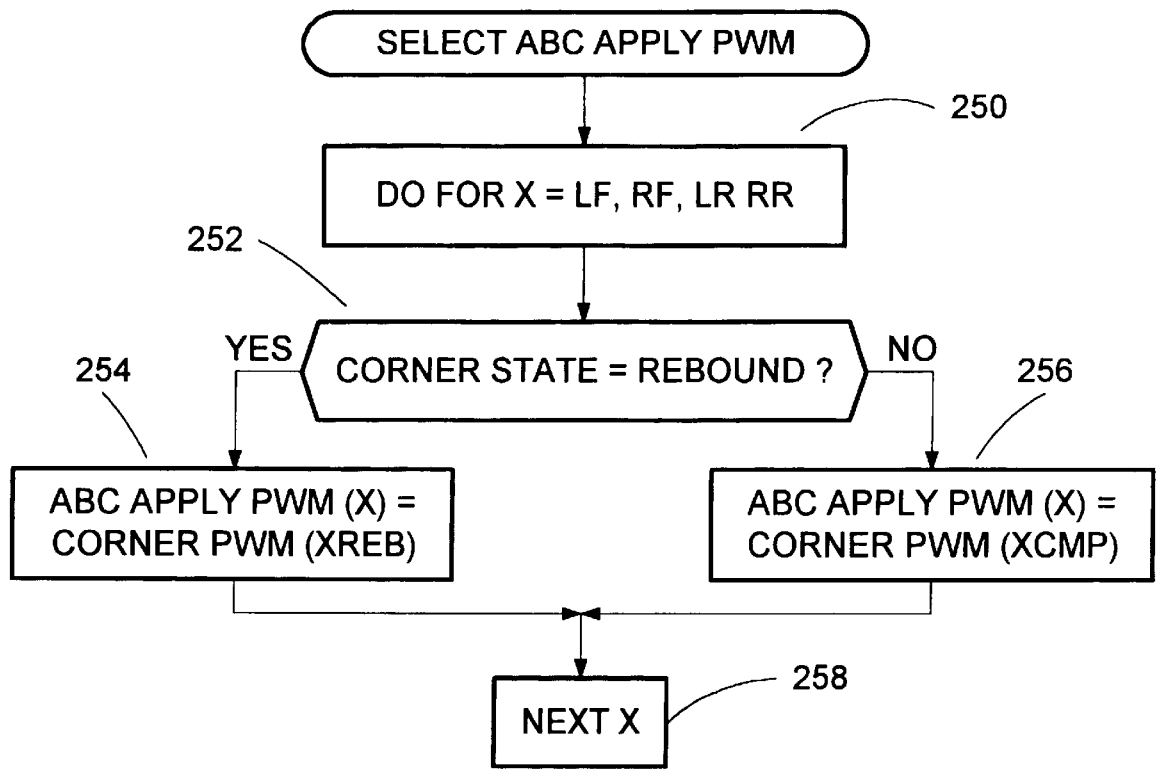

The eight corner direction commands CORNER PWM (XY) on bus 184 are provided along with the signals on bus 76 to the apply command generator block 186. Block 186 uses the high pass filtered relative velocity signals on bus 76 to determine whether each corner is in a compression or a rebound state and select the corresponding compression or rebound CORNER PWM (XY) command for that corner for the ABC APPLY PWM (X) commands on bus 79. With reference to the flow chart of FIG. 8, the process SELECT ABC APPLY PWM first declares parameters of a DO loop at 250 for each of the four corners: X=LF, RF, LR, RR. For each corner, the compression/rebound state of the damper is determined at 252 by examining the high pass filtered relative velocity signal for the corner. If that signal is greater than or equal to zero, indicating that the corner is in rebound, then the rebound CORNER PWM (Y=REB) command for that corner is selected at 254 as the ABC APPLY PWM command for that corner on bus 79. Otherwise the compression CORNER PWM (Y=CMP) command for that corner is selected at 256 as the corner ABC APPLY PWM command on bus 79. The next value of X is then chosen at 258 to repeat the loop, thus determining the corner ABC APPLY PWM commands for the left front, left rear and right rear corners for output on bus 79 in a similar manner.

Figure 9:
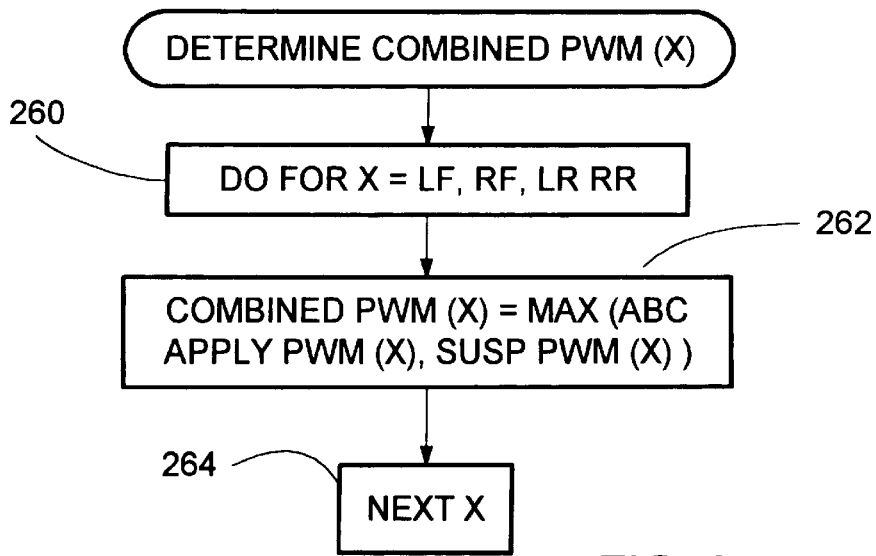

As previously stated, the ABC APPLY commands serve as minimum PWM values for each corner. This can be accomplished for each corner as shown in the flow chart of FIG. 9. The subroutine DETERMINE COMBINED PWM (X) proceeds at 260 in a DO loop for X=LF, RF, LR, RR. The maximum of ABC APPLY PWM (X) and SUSP PWM (X) is selected at 262 for the value of COMBINED PWM (X). The next value of X is then chosen at 264 until all four corners have determined values of COMBINED PWM (X). It may be noted that the previously mentioned U.S. Pat. No. 5,606,503, which describes automatic control algorithm 82 in greater detail, shows a process block 220 titled "automatic mode PWM duty cycle floor," which provides an opportunity to set a minimum PWM value for each corner. That block could be modified to receive the ABC APPLY PWM commands from active brake body control 75 in this apparatus and determine the maximum of the values at each corner as described above, as an alternative to performing the same function in environmental compensation block 92 as described herein.

This invention is also applicable to suspension systems using bi-state, real time controlled dampers. Such dampers differ from the continuously variable dampers used in the preferred embodiment described above in that, although they can be switched between two different valve conditions (low damping or high damping, as by opening or closing a bypass valve that supplements the main damper valving) sufficiently fast for real time suspension control, they cannot be switched sufficiently fast for pulse width modulated continuously variable valving. Thus, the value of BASIC ABC PWM as determined in block 150 and described with reference to the flow chart of FIG. 5 can assume only the values of zero, as in step 208, or K, as in step 202, and cannot be phased out through intermediate values as indicated in step 206. In fact, the value of K can be designed into the damper with a flag bit indicating high (1) or low (0) damping within the software.

Through the use of the mask data elements the controller controls the left and right suspensions during active brake control events, that is, during times when at least one of the left or right front wheel brakes is receiving greater braking pressure than the other in an active brake control mode to affect the yaw velocity and/or slip angle of the vehicle. In general, if the active brake control event would tend to cause a front left corner body dip and a right rear corner body rise, then the application of the selected mask data element increases the damping on the left front during suspension compression and on the right rear during suspension rebound. This can be seen with reference to the mask table shown above, wherein the left active mask L ACT MASK shows values of 1, indicating application of ABC damping, for the left front corner in compression and the right rear corner in rebound. The left inactive mask L HOLD MASK shows values of 1 for the right rear corner in compression and the left front corner in rebound to prevent an opposite body tilt on the release of the one sided brake apply. But in this embodiment it also shows retention of the 1's at the left front corner in compression and the right rear corner in rebound; and not shown in the table is the fact, described above, that the ABC damping commands are phased out while the ABC flags show the brake system inactive. Thus, the result of the left active brake activity is to provide damping at the left front in compression and the right rear in rebound while the flag is active and to add damping at the left front in rebound and the right rear in compression when the flag goes inactive, while phasing out all added damping together.

A basic difference should be noted in the application of damping commands by active brake body control 75 of this invention and the prior art semi-active suspension control described as automatic control algorithm 82. The prior art system modified by this invention applies damping in the classic semi-active "sky hook" manner. The control is primarily body control oriented for occupant comfort; and damping is increased only when so doing would provide a force on the body in the correct direction to retard vertical movement of the body. This is determined by comparing the vertical direction of demand force with the direction of the damper (compression or rebound), as described in the referenced U.S. Pat. No. 5,606,503 with reference to the quadrant power check of block 316 in that patent. When demand force on the body results from upward body movement and the damper is in a rebound state (extension), the demand force can be applied by a damper (by resisting extension, the damper is able to resist upward body movement). This is also true when demand force results from downward movement of the body and the damper is in a compression state. Thus, the demand force command is provided to each damper only in the two quadrants wherein the direction of demand force (or body movement) matches the damper state. In the other two quadrants, the damper is not activated.

In contrast, the goal of the control of this invention is primarily vehicle handling; and the damping commands produced by active brake body control 75 of this invention are applied in response to the compression/rebound state of the damper as mapped by the data mask, without regard to the direction of demand force or vertical body motion. Thus, the damping commands for a corner produced by the two controls are determined independently of each other and will not always provide zero and non-zero values simultaneously. This is expected, since the objectives of the two controls are different.

What is claimed is:

1. A method of controlling a front corner suspension and a diagonally opposed rear corner suspension in a vehicle having a brake system with two front corner brakes and brake control means effective at times to modify vehicle yaw rate by applying a greater braking force to one of the front corner brakes adjacent the front corner suspension than to the other of the front corner brakes and generate an active brake signal while so doing, the method comprising the steps:

receiving the active brake signal;

determining a relative velocity of the front corner suspension and a relative velocity of the diagonally opposed rear corner suspension;

determining a compression damping command for the front corner suspension and a rebound damping command for the diagonally opposed rear corner suspension;

while the signal is received, applying the compression damping command to the front corner suspension when the relative velocity thereof indicates that it is in compression; and while the signal is present, applying the rebound damping command to the diagonally opposed rear corner suspension when the relative velocity thereof indicates that it is in rebound.

2. A method of controlling a front corner suspension damper and a diagonally opposed rear corner suspension damper in a vehicle having a suspension damper at each corner thereof and a brake system with two front corner brakes and brake control means effective at times to modify vehicle yaw rate by applying a greater braking force to one off the front corner brakes adjacent the front corner suspension than to the other of the front corner brakes and generate an active brake signal while so doing, the method comprising the steps:

receiving the active brake signal;

determining a relative velocity of each of the suspension dampers and deriving from the determined relative velocities a demand force command for each of the dampers;

applying each of the derived demand force commands to its respective damper only when a comparison of the direction of the demand force command with the sensed relative velocity of the damper indicates that a force corresponding to the demand force command can be effectively exerted by the damper;

determining an active brake compression damping command for the front corner suspension damper adjacent the one of the front corner brakes and a relative velocity of the diagonally opposed rear corner suspension damper;

while the signal is received, applying the compression damping command to the front corner suspensions when the relative thereof indicates that it is in compression; and while the signal is present, applying the rebound damping command to the diagonally opposed rear corner suspension when the relative velocity thereof indicates that it is in rebound.

3. A vehicle suspension system for use on a vehicle with a brake system having two front corner brakes and a brake control responsive to a vehicle dynamic sensor to apply a greater braking force to one of the front corner brakes than to the other of the front corner brakes and generate an active brake signal when so applying the greater braking force, the suspension system comprising:

two front corner suspensions;

two rear corner suspensions; and a suspension control computer comprising, in combination:

means for receiving the active brake signal, means for determining a relative velocity of one of the front corner suspensions adjacent the one of the front corner brakes and a relative velocity of one of the rear corner suspensions diagonally opposing the one of the front corner suspensions, means for determining a compression damping command for the one of the front corner suspensions and determining a rebound damping command for the one of the rear corner suspensions, means effective, while the active brake signal is received, for applying the compression damping command to the one of the front corner suspensions when the relative velocity of the one of the front corner suspensions indicates that it is in compression, and means effective, while the signal is received, for applying the rebound damping command to the one of the rear corner suspensions when the relative velocity for the one of the rear corner suspensions indicates that it is in rebound.

4. A vehicle suspension system for use on a vehicle with a brake system having two front corner brakes and a brake control responsive to a vehicle dynamic sensor to apply a greater braking force to one of the front corner brakes than to the other of the front corner brakes and generate an active brake signal when so applying the greater braking force, the suspension system comprising:

two front corner suspensions each comprising a front damper;

two rear corner suspensions each comprising a rear damper;

relative velocity sensors at each of front and rear dampers;

means for deriving demand force commands for each of the two front corner suspensions and two rear corner suspensions in response to signals from the relative velocity sensors;

means for applying the derived demand force commands to the front and rear dampers only when a comparison of the direction of the demand force command for a damper with the sensed relative velocity of the damper indicates that a force corresponding to the demand force command can be effectively exerted by the damper;

means for receiving the active brake signal;

means for determining an active brake compression damping command for one of the front corner suspensions adjacent the one of the front corner brakes and determining an active brake rebound damping command for one of the rear corner suspensions diagonally opposing the one of the front corner suspensions;

means effective, while the active brake signal is received, for applying the active brake compression damping command to the one of the front corner suspensions when the relative velocity of the one of the front corner suspensions indicates that it is in compression; and means effective, while the signal is received, for applying the active brake rebound damping command to the one of the rear corner suspensions when the relative velocity of the one of the rear corner suspensions indicates that it is in rebound.

* * * * *